US008898907B1

(12) United States Patent
Bong (10) Patent No.: US 8,898,907 B1
(45) Date of Patent: Dec. 2, 2014

(54) ASSEMBLY, SYSTEM AND METHOD FOR AUTOMATED VERTICAL MOMENT CONNECTION

(76) Inventor: William L. Bong, Walnut Creek, CA (US)

(*) Notice: Subject to any disclaimer, the term of this patent is extended or adjusted under 35 U.S.C. 154(b) by 545 days.

(21) Appl. No.: 13/309,712

(22) Filed: Dec. 2, 2011

Related U.S. Application Data (62) Division of application No. 12/701,038, filed on Feb. 5, 2010, now Pat. No. 8,074,359.

(60) Provisional application No. 61/152,818, filed on Feb. 16, 2009.

(51) Int. Cl.
*B21D 47/00* (2006.01)
*B21K 23/00* (2006.01)
*B23P 17/00* (2006.01)

(52) U.S. Cl.
USPC .............................. 29/897.3; 219/73.1; 52/838

(58) Field of Classification Search
CPC ..... E04C 3/00; E04C 3/04; E04C 2003/0408; E04C 2003/0452; B23K 25/00
USPC ................. 29/897.3, 897.31, 897.33, 897.35, 29/897.1; 403/232.1; 219/73.1; 52/837, 52/838, 848, 854, 855, 719
See application file for complete search history.

(56) References Cited

U.S. PATENT DOCUMENTS

| | | | | |
|---|---|---|---|---|
| 3,716,957 A | * | 2/1973 | Bernardi | 52/633 |
| 3,890,757 A | * | 6/1975 | Lamer et al. | 52/695 |
| 6,237,303 B1 | * | 5/2001 | Allen et al. | 52/838 |
| 6,297,472 B1 | * | 10/2001 | Bong et al. | 219/125.12 |
| 7,148,443 B2 | * | 12/2006 | Bong | 219/73.1 |
| 7,762,038 B2 | * | 7/2010 | Ceba et al. | 52/653.1 |
| 2004/0187430 A1 | * | 9/2004 | Takeuchi et al. | 52/729.1 |
| 2005/0023262 A1 | * | 2/2005 | Bong et al. | 219/130.5 |

* cited by examiner

*Primary Examiner* — David Bryant
*Assistant Examiner* — Christopher M Koehler
(74) *Attorney, Agent, or Firm* — Charles L. Thoeming

(57) ABSTRACT

An automated assembly, system and method for a narrow-gap Electroslag-welded moment connection welded between horizontal beam to vertical column flanges includes vertical column doubler plates affixed to the column web and horizontal beam doubler plates affixed to the beam web with alignment of the respective webs/doubler plates to carry the moment load through the vertical support columns. An embodiment includes a radius in each horizontal beam doubler plate. The assembly, system and method are readily applicable to overdesign moment load factors.

10 Claims, 8 Drawing Sheets

RECOMMENDED CONTOUR OF PLATES "b"

ASSEMBLY, SYSTEM AND METHOD FOR AUTOMATED VERTICAL MOMENT CONNECTION

CROSS-REFERENCES TO RELATED APPLICATIONS

This Divisional Patent Application is based upon and claims the priority of U.S. Non-Provisional patent application Ser. No. 12/701,038, filed Feb. 5, 2010 (the "'038 Application), that issued as U.S. Letters Pat. No. 8,074,359 on Dec. 13, 2011. The '038 Application is based upon and claims the priority of U.S. Provisional Patent Application Ser. No. 61/152,818, filed Feb. 16, 2009.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to welding. More particularly, the invention is related to an assembly, system and method for automated narrow-gap Electroslag-welded moment connections (welded between two vertical column flanges) for the construction of low-rise and high-rise buildings.

BACKGROUND OF THE INVENTION

My U.S. Pat. No. 6,297,472 [the "'472 Patent"], issued Oct. 2, 2001, discloses and claims a welding system and method including a distributed welding control system that allows a welding operator to program automated welding cycles for various welding operations, and that is particularly useful for installing stiffener plates onto structural beams. In U.S. Pat. No. 6,297,472, the welding system includes a welding fixture with a pair of opposing, positionally adjustable welding shoes, and lock screws for attaching a workpiece such as an I-beam. A rotary straight wire feeder removes the cant and helix from welding wire as it is fed to the welding torch. The welding torch is attached to the power cables coming from the welding power supply and is a receptacle for the consumable guide tube. Wire feed conduits are attached to the wire feeder on one end and the welding torch on the other. During the welding operation, welding wire is feed from the wire feeder, through the wire feed conduits to the welding torch. The wire then travels through the welding torch to the consumable guide tube and is attached to the output of the welding torch. The consumable guide tube and the welding wire carry the welding current to the molten weld puddle at the bottom of the weld cavity, and is suitable for the present application for an assembly, system and method for automated vertical moment connection.

My U.S. patent application Ser. No. 10/731,414, filed Dec. 9, 2003 and related U.S. Letters Patent 7,429,716 [the "'716 Patent"], discloses and claims a modular welding system for performing quick, easy and high quality welds. The modular welding system of application Ser. No. 10/731,414, and related U.S. Letters Patent 7,429,716 issued Sep. 30, 2008, includes a basic component system and a modular fixture component system. The basic component system provides the basic components necessary to perform a quality weld efficiently. The modular component system interfaces with the basic component system and provides a particular welding fixture assembly that performs a particular type of weld. More particularly, a stiffener type modular component system and a butt/tee type modular system fixture system are disclosed and claimed. The modular welding system of application Ser. No. 10/731,414, and related U.S. Letters Patent 7,429,716, easily may be integrated with the basic components of the assembly, system and method for automated vertical moment connection.

My U.S. Pat. No. 7,038,159 [the "'159 Patent"], issued May 2, 2006, discloses and claims a system and method for Electroslag butt-welding expansion joint rails comprising a distributed welding control system. The method includes defining a weld cavity with a first expansion joint rail, a second expansion joint rail, a plurality of gland shoes, and a pair of butt shoes, and can be adapted for welding an expansion joint rail to a support beam. The system and method of U.S. Pat. No. 7,038,159 easily may be integrated with the basic components the present application for an assembly, system and method for automated vertical moment connection.

My U.S. Pat. No. 7,148,443 [the "'443 Patent"], issued Dec. 12, 2006, discloses and claims a consumable guide tube including a thin first elongate strip, a second elongated strip, and a plurality of insulators. An embodiment of U.S. Pat. No. 7,148,443 includes a thin first elongate strip that is a low carbon cold-rolled steel strip, and a second elongated strip which is a low carbon hot-rolled steel strip. The guide tube of U.S. Pat. No. 7,148,443 can also be configured to include two or more longitudinal channels, and easily is adaptable to the assembly, system and method for automated vertical moment connection.

My U.S. patent application Ser. No. 11/591,190, filed Oct. 30, 2006, discloses and claims a consumable guide tube including a thin first elongate strip, a second elongated strip, and a plurality of insulator modules. An embodiment of application Ser. No. 11/591,190 includes a thin first elongate strip that has a front face and a back face. The front face has at least one longitudinal channel. The second elongated strip has is a front face and a back face and the front face is of the second elongated strip is configured to be coupled to the front face of the thin first elongated strip. A plurality of insulator modules are deposited on the back face of the thin first elongated strip and on the back face of the second elongated strip. Preferably, the thin first elongated strip is a low carbon cold rolled steel strip, and the second elongated strip is a low carbon hot rolled steel strip. The guide tube of application Ser. No. 11/591,190 can also be configured to include two or more longitudinal channels. The guide tube of U.S. patent application Ser. No. 11/591,190 can also be configured to include two or more longitudinal channels, and easily is adaptable to the present application for an assembly, system and method for automated vertical moment connection.

My U.S. patent application Ser. No. 12/483,977, filed Jun. 12, 2009 [the "'977 Application"], discloses and claims a system and method for narrow-gap Electroslag-welded moment connections welded between vertical column flanges and includes vertical column doubler plates with top and bottom stiffeners and horizontal beam side plates aligned with the doubler plates to carry the moment load through the vertical support columns. An embodiment of the '977 Application includes a radius in each side plate. Disclosure of an automated modular method for narrow-gap electroslag-welded moment connections is included in the '977 Application, and the '977 Application is readily suitable for the present application for an assembly, system and method for automated vertical moment connection.

The following disclosure provides an assembly, system and method for Electroslag welding horizontal beams to vertically aligned work-pieces for structures with unlimited multiple floor levels, in particular spliced vertical columns to provide moment connections with overdesign factors. An embodiment includes a distributed control system having a plurality of controller modules and a common bus connecting each controller module. Each controller module includes at least one operator control panel module. The system includes at least one welding torch configured to receive at least one consumable guide tube that is placed into the welding cavity. The welding torch is coupled to the welding fixture adjacent to each centerline. The system also includes first and second elongated, parallel rotating shafts according to U.S. Letters Pat. No. 7,148,443 and pending U.S. Non-provisional Utility Patent application Ser. No. 11/202,020, which are herein incorporated; first and second linear actuators according to U.S. Letters Pat. No. 7,148,443 and pending U.S. Non-provisional Utility Patent Application Ser. No. 10/731,414 and related U.S. Letters Pat. No. 7,429,716, which are herein incorporated. These actuators are movably mounted on the rotating shafts and include an assembly for longitudinally translating the linear actuators along the shafts as the shafts rotate according to U.S. Letters Pat. No. 7,148,443 and pending U.S. Non-provisional Utility Patent application Ser. No. 10/731,414 and related U.S. Letters Pat. No. 7,429,716, which are herein incorporated. The system also includes an assembly for sensing movement of the linear actuators according to U.S. Letters Pat. No. 7,148,443 and pending U.S. Non-provisional Utility Patent application Ser. No. 10/731,414 and related U.S. Letters Pat. No. 7,429,716, which are herein incorporated, and a protective housing assembly for enclosing the rotating shafts, the actuators, the longitudinally translating assembly, and the sensing assembly, for oscillating each welding torch with the cavity.

My U.S. Pat. No. 7,429,716 [the "'716 Patent"], issued Sep. 30, 2008, discloses and claims a basic component system and a modular fixture component system for performing quick, easy and high quality welds.

The automated assembly, system and method for vertical moment connection welding combines certain disclosed and claimed features of my patents described herein, and and/or their continuation or continuation-in-part progeny, to allow a welding operator to program automated welding cycles for various welding operations; and, as a result, these patents are particularly useful for an automated assembly, system and method for vertical moment connection welding.

DISCLOSURE OF INVENTION

As used in this application, the term "Electroslag" refers to Electroslag welding ("ESW"). ESW is a highly productive, single pass welding process for materials in a vertical or close to vertical position. In ESW an electric arc is initially struck by wire that is fed into the desired weld location and then flux is added. Additional flux is added until the molten slag, reaching the tip of the electrode, extinguishes the arc. The wire is then continually fed through a consumable guide tube that can oscillate if desired, into the surfaces of the metal work-pieces. Filler metal is then melted using the electrical resistance of the molten slag to cause coalescence. The wire and tube then move up along the workpiece while a copper retaining shoe that was put into place before starting (can be water-cooled if desired) is used to keep the weld between the plates that are being welded. This process typically uses a direct current (DC) voltage usually ranging from about 600 A and 40-50V, with higher currents needed for thicker materials. Because the arc is extinguished, this is not an arc process.

When erecting high-rise buildings (on site), horizontal beam flanges are welded to vertical column flanges by either (1) multipass "gasless flux-core" wire welding process, or (2) multipass "gas shielded flux-core" wire welding process. Either option presents a long and laborious process. To facilitate the speed of erecting a low-rise or high-rise building, Arcmatic™ has devised an assembly, system and method of automating the welding process to make the moment connection much stronger by welding doubler plates to the vertical column web and the horizontal beam web at the beam-to-column moment connection. This assembly, system and method also makes vertical moment connection welds much faster by using a newly designed mechanized and automated welding system to facilitate the welding process, to reduce welding time, and to strengthen the weld beam-to-column flange weld connection while erecting the building "on the job." Further, this beam-to-column moment connection assembly, method and system is applicable to any current welding techniques, processes, or systems including, but not limited to, solid state computer controlled welding, flux-cored wire welding, metal-core wirer welding, gas meal arc welding, resistance welding, arc welding, electron beam welding, Electroslag welding, induction welding, laser beam welding, thermit welding, or any other welding process.

The automated assembly, system and method for vertical moment connection welding includes (1) a vertical column web 510 between shop welded doubler plates, 530 and 540, (2) a horizontal beam web 210 between shop welded doubler plates, 230 and 240, (3) a horizontal beam erection support assembly 400, including a sump 410, wedges 420, and a jack screw assembly 430, (4) a weld cavity 440 between the supported horizontal beam and the vertical column web, and (5) copper shoes 310 on either side of the weld cavity to retain the molten VertaSlag™ weld puddle. One VertaSlag™ weld joint is required to connect the horizontal beam to the vertical column for the beam-to-column moment connection.

An embodiment of the automated assembly, system and method for automated moment connection Electroslag welding includes the following assembly sequence:

a) providing two doubler plates, 530 and 540, of equal length and thickness;

b) shop welding the two doubler plates, 530 and 540, on either side of a vertical column web 510 at the horizontal beam-to-column moment connection location;

c) providing two second doubler plates, 230 and 240, of equal length and thickness, each second doubler plate having an equal sized radius 290;

d) shop welding the second doubler plates, 230 and 240, on either side of a horizontal beam web 210 end;

e) providing a horizontal beam erection support assembly 400, including a sump 410, wedges 420, and a jack screw assembly 430;

f) shop welding the horizontal beam erection support assembly 400 to the side of the vertical column web 510 at the horizontal beam-to-column moment connection location;

g) positioning the horizontal beam web 210 end with welded doubler plates, 230 and 240, into the horizontal beam erection support assembly 400 thus defining a weld cavity 440 between the supported horizontal beam web 210 with doubler plates and the vertical column flange 520;

h) placing copper welding shoes 310 on either side of the weld cavity 440;

i) placing a loose run-off tab 260 made from copper or steel on top of the horizontal beam web 210 and doubler plates, 230 and 240; and j) Electroslag™ welding the horizontal beam web 210 and doubler plates, 230 and 240, to the vertical column flange 520 at the location of the vertical column web 510 and welded doubler plates, 530 and 540.

An embodiment of the automated assembly, system and method for vertical moment connection welding includes the following welding sequence:

a) providing at least one consumable guide tube inside the weld cavity 440, each guide tube comprising sufficient insulation to keep the guide tube from shorting against a parent material;

b) providing at least one VertaSlag™ welding torch above each corresponding weld cavity 440 to correspond to each consumable guide tube located inside the weld cavity 440;

c) placing copper runoff blocks 260 on top of the web plate horizontal beam web 210 and doubler plates, 230 and 240, and the vertical column flange plates to keep the weld puddle from running down the submerged arc weld joint when the VertaSlag™ weld reaches the top of the weld cavity 440;

d) attaching at least one wire feed conduit to each VertaSlag™ weld torch to convey the welding wire down the guide tube to perform the VertaSlag™ welding operation, depending on the size of guide tube and the number of welding wires used to perform the welding operation, wherein the size of the guide tube and the number of wires used depends on the thickness of the stiffener to be welded;

e) attaching a sufficient number of 4/0 cables to carry the necessary welding current to each VertaSlag™ welding torch f) initiating each weld one at-a-time to stagger the start and stop times;

g) removing the corresponding welding torch when each weld has been completed;

h) adding metal powder to the weld joint between the horizontal beam web and doubler plates and the vertical column flange at the location of the vertical column web and welded doubler plates; and i) providing the final VertaSlag™ weld to join the horizontal beam web 210 and doubler plates, 230 and 240, to the vertical column flange at the location of the vertical column web 510 and welded doubler plates, 530 and 540, with any pre-qualified welding process.

Other features, advantages, and objects of the automated assembly, system and method for vertical moment connection welding will become apparent with reference to the following description and accompanying drawings.

These together with other objects of the automated assembly, system and method for vertical moment connection welding, along with the various features of novelty which characterize the system or method, are described with particularity in the claims attached to and forming a part of this disclosure. For a better understanding of the automated assembly, system and method for vertical moment connection welding, its operating advantages and the specific objects attained by its uses, reference should be made to the attached drawings and descriptive materials in which there are illustrated preferred embodiments of the assembly, system or method.

BRIEF DESCRIPTION OF DRAWINGS

The above stated features, aspects, and advantages of the automated assembly, system and method for vertical moment connection welding will become better understood with regard to the following description, appended claims, and accompanying drawings as further described.

FIG. 7 is a top perspective exploded view of the moment connection FIG. 6.

BEST MODE FOR CARRYING OUT THE INVENTION

My following U.S. Letters Patent or pending U.S. Patent Applications are incorporated by reference as if fully set forth herein: U.S. Pat. No. 6,297,472 for Welding System and Method, issued Oct. 2, 2001 (the "'472 Patent"); U.S. Pat. No. 7,038,159 for Electroslag Butt-Welding Expansion Joint Rails, issued May 2, 2006 (the "'159 Patent"); U.S. Pat. No. 7,148,443 for Consumable Guide Tube, issued Dec. 12, 2006 (the "'443 Patent"); U.S. Pat. No. 7,429,716 for Modular Welding System, issued Sep. 30, 2008 (the "'716 Patent"), and U.S. Non-provisional patent application Ser. No. 12/483, 977, filed Jun. 12, 2009 (the "'977 Application").

Referring more specifically to the drawings, for illustrative purposes the automated assembly, system and method for vertical moment connection welding is embodied generally in FIGS. 1-17. It will be appreciated that the assembly, system and/or method may vary as to configuration and as to the details of the parts, and that use of the assembly, system and/or method may vary as to details and to the order of steps, without departing from the basic concepts as disclosed herein. The automated assembly, system and method for vertical moment connection welding are disclosed generally in terms of beam-to-column welding, as this particular type of welding operation is widely used. However, the disclosed automated assembly, system and method for vertical moment connection welding may be used in a large variety of welding applications, as will be readily apparent to those skilled in the art.

The automated assembly, system and method for beam-to-column moment connection method and system is applicable to any current welding techniques, processes, or systems including, but not limited to, solid state computer controlled welding, flux-cored wire welding, metal-core wirer welding, gas meal arc welding, resistance welding, arc welding, electron beam welding, Electroslag welding, induction welding, laser beam welding, thermit welding, or any other approved welding process.

The automated assembly, system and method for vertical moment connection includes: (1) vertical welding the doubler plates, 530 and 540, to the vertical column web 510 and flanges 520 with HD-SubArc™, or any other approved welding process, in the shop, FIGS. 1 and 2; (2) welding the doubler plates, 230 and 240, to the horizontal beam web 210 and flanges 220 with HD-SubArc™, or any other approved welding process, in the shop, FIGS. 3 and 4; and (3) field welding the horizontal beam to the vertical column on the job site using VertaSlag™, or any other approved welding process. The method and system further includes having the horizontal beam 200 temporarily secured to the vertical column flange 510, FIGS. 6-7A, with the horizontal beam erection support assembly 400 to hold the horizontal beam 200 in position along the moment connection horizontal centerline until the Electroslag field weld 300 has been completed, FIGS. 8-11C.

The horizontal beam web 210 extends beyond the horizontal beam flanges 220 for a designed length. The horizontal beam web doubler plates, 230 and 240, each have a corresponding vertical edged end with a length corresponding to the horizontal beam web 210 extended length and a radius 290 end.

An embodiment of the automated assembly, system and method for vertical moment connection welding includes the following assembly sequence:

a) providing two doubler plates, 530 and 540, of equal length and thickness;

b) shop welding the two doubler plates, 530 and 540, on either side of a vertical column web 510 at the horizontal beam-to-column moment connection location;

c) providing two second doubler plates, 230 and 240, of equal length and thickness, each second doubler plate having an equal sized radius 290;

d) shop welding the second doubler plates, 230 and 240, on either side of a horizontal beam web 210 end;

e) providing a horizontal beam erection support assembly 400, including a sump 410, wedges 420, and a jack screw assembly 430;

f) shop welding the horizontal beam erection support assembly 400 to the side of the vertical column web 510 at the horizontal beam-to-column moment connection location;

g) positioning the horizontal beam web 210 end with welded doubler plates, 230 and 240, into the horizontal beam erection support assembly 400 thus defining a weld cavity 440 between the supported horizontal beam web 210 with doubler plates and the vertical column flange 520;

h) placing copper welding shoes 310 on either side of the weld cavity 440;

i) placing a loose run-off tab 260 made from copper or steel on top of the horizontal beam web 210 and doubler plates, 230 and 240; and j) Electroslag™ welding the horizontal beam web 210 and doubler plates, 230 and 240, to the vertical column flange 520 at the location of the vertical column web 510 and welded doubler plates, 530 and 540.

An embodiment of the automated assembly, system and method for vertical moment connection welding includes the following welding sequence:

a) providing at least one consumable guide tube inside the weld cavity 440, each guide tube comprising sufficient insulation to keep the guide tube from shorting against a parent material;

b) providing at least one VertaSlag™ welding torch above each corresponding weld cavity 440 to correspond to each consumable guide tube located inside the weld cavity 440;

c) placing copper runoff blocks 260 on top of the web plate horizontal beam web 210 and doubler plates, 230 and 240, and the vertical column flange plates to keep the weld puddle from running down the submerged arc weld joint when the VertaSlag™ weld reaches the top of the weld cavity 440;

d) attaching at least one wire feed conduit to each VertaSlag™ weld torch to convey the welding wire down the guide tube to perform the VertaSlag™ welding operation, depending on the size of guide tube and the number of welding wires used to perform the welding operation, wherein the size of the guide tube and the number of wires used depends on the thickness of the stiffener to be welded;

e) attaching a sufficient number of 4/0 cables to carry the necessary welding current to each VertaSlag™ welding torch f) initiating each weld one at-a-time to stagger the start and stop times;

g) removing the corresponding welding torch when each weld has been completed;

h) adding metal powder to the weld joint between the horizontal beam web and doubler plates and the vertical column flange at the location of the vertical column web and welded doubler plates; and i) providing the final VertaSlag™ weld to join the horizontal beam web 210 and doubler plates, 230 and 240, to the vertical column flange at the location of the vertical column web 510 and welded doubler plates, 530 and 540, with any pre-qualified welding process.

Figure 1:
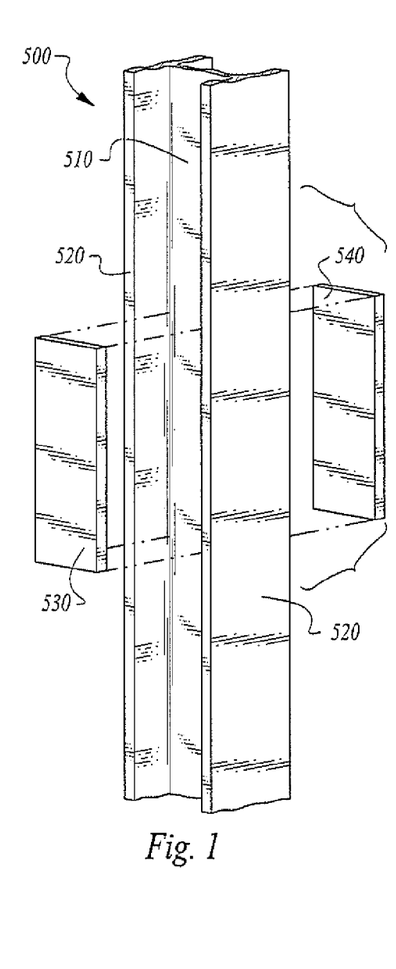
FIG. 1 is a perspective view of a section of vertical column 500 depicting the vertical column web 510, vertical column flanges 520, a first vertical column doubler plate 530, and a second vertical column doubler plate 540 prior to shop welding the doubler plates, 530 and 540, to the vertical column web 510 and flanges 520.
Figure 2:
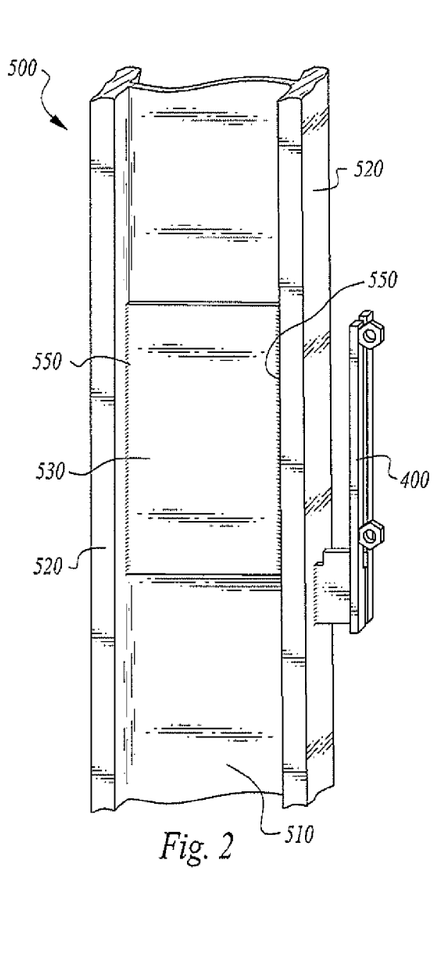
FIG. 2 is a perspective view of a section of vertical column 500 depicting the vertical column web 510, vertical column flanges 520, a first vertical column doubler plate 530, and a representative shop weld 550 after shop welding the first vertical column doubler plate 530 to the vertical column web 510 and inside of the vertical column flanges 520, and shop welding the horizontal beam erection support assembly to the outside of the vertical column flange 520 corresponding to the beam-to-column placement for the moment connection.

The vertical column 500 assembly is provided generally in FIGS. 1-2. The horizontal beam 200 assembly is provided generally in FIGS. 2-3. In most cases, the horizontal beam flange 220 is narrower than the vertical column flange 520. This allows the horizontal beam web 210 and doubler plates, 230 and 240, to be welded to the vertical column flange 510 using VertaSlag™, or any other approved welding process. The weld between the horizontal beam web 210 and doubler plates, 230 and 240, and the vertical column flange 510 is a full penetration weld for the full length of the doubler plate vertical edged end and corresponding height of the horizontal beam web 210.

Aspects of the design of the beam-to-column moment connection considering an over design factor are more specifically detailed in the schematic figures depicted in FIGS. 12-17.

For the views depicted in FIGS. 12-17, and the design calculations presented in this specification, the following defined data variables are presented:

1. Data:
   a. BEAM DATA:
      Bd=Beam Depth (Inches)
      Btw=Beam Web Thickness (Inches)
      Bbc=Beam Flange Width (Inches)
      Btf=Beam Flange Thickness
      BK=Beam "K" Distance (as defined in AISC code (Inches)
      BSxx=Beam Modulus Section (inches)
   b. COLUMN DATA: $W_{xx}(X)_{xxx}$
      Cd=Column Depth (inches)
      Ctw=Column web thickness (inches)
   c. PERCENTAGE OVER DESIGN: =Δ%
      SF=Factor of Overdesign=(1+Δ/100)
   d. DEFINITIONS:
      Fy=Yield Stress
      Fb=0.66 Fy=Allowable bending stress American Institute of Steel Construction ("AISC") code 1-1*
   Fv=0.40 Fy=Allowable shear stress (AISC code F4.1)*
   e. ASSUMPTIONS: All materials, beams, columns, and plates are the same grade—e.g. Same yield stress
   *(AISC Chapter F)

2. Calculation of Connection Thickness=(Tc)

The calculation of vertical column web and doubler plate thickness and horizontal beam web and doubler plate thickness is found following the following calculations:

$$\text{Maximum Bending Moment generated by the Beam} = BS_{xx}(X)Fb \qquad 1$$

$$\text{Design moment } Mo = SF(X)BS_{xx}(X)Fb \qquad 2$$

Maximum allowable bending moment at section 0-0

$$Mo = \frac{Tc(X)Wb^2}{6}(X)Fb \qquad 3$$

Mo=Design Moment $$\frac{Tc(X)Wb^2}{6}(X)Fb = SF(X)BS_{xx}(X)Fb \qquad 4$$

$$\therefore Tc = \frac{6(X)SF(X)BSxx}{Wb^2} \qquad 6$$

Where: Wb=Bd (−) 2K

Maximum Shear stress at 0 (−) 0:

$$Fv_o = Bd(X)Btw(X)Fv/Wd(X)Tc \qquad 6$$

Expressed as a Percentage of Allowable Stress:

$$Fv_o(X)100/Fv = Btw(X)100/Wd(X)Tc = \% \text{ of Shear Stress at Section 0-0 as percentage of Beam Shear Stress } Fv \qquad 7$$

3. Plate "a" Thickness:

$$Ta = Tc(-)Ctw/2 \qquad 8$$

4. Plate "B" Thickness:

$$Tb = Tc(-)Btw/2 \qquad 9$$

Figure 14:
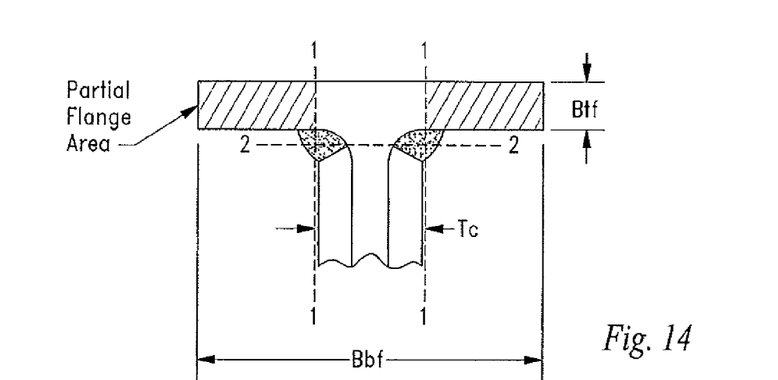
FIG. 14 is a calculation schematic for a partial view of an enlarged portion of a horizontal beam flange of FIGS. 3-5B and web doubler plates shop welded to the beam flange and web.

5. Calculate Minimum Weld Length:

The full force developed by the beam flange must be transferred to the block formed by the two plates "b"+Btw through the weakest path (FIG. 14).

Example case through section 1-1

$$\text{Partial force} = (Bbf(-)Tc)/2(X)Btf(X)Fb(X)SF \qquad 10$$

$$\text{Shear through Section 1-1} = Lw1(X)Btf(X)Fv \qquad 11$$

Equate: #10 and #11

$$(Bbf(-)Tc)/2(X)Btf(X)0.66Fy(X)SF = Lw1Btf(X)0.4Fy$$

$$\therefore Lw1 = SF0.66[Bbf(-)Tc]/0.4(X)2 = 0.825 \times SF[Bbf(-)Tc] \qquad 12$$

Where Lw1=minimum length at weld required at path 1-1

Case through section 2-2:

$$\text{Total Force} = SF(X)Bbf(X)Btf(X)Fb \qquad 13$$

$$\text{Shear through 2-2} = Lw_2(X)Tc(X)Fv \qquad 14$$

Equating formulas #13 and #14

$$SF(X)Bbf(X)Btf(X)0.66(X)Fy = Lw_2(X)Tc(X)0.4(X)Fy$$

$$\therefore Lw_2 = SF(X)0.66/0.4Bbf(X)Btf/Tc$$

$$\therefore Lw_2 = 1.65(X)SF(X)Bbf(X)Btf/Tc \qquad 15$$

Where Lw2=minimum length of weld required through path 2-2

Select as Lw the Larger value of Lw1 or Lw2

6. Slope of Beam Doubler Plate

Figure 13:
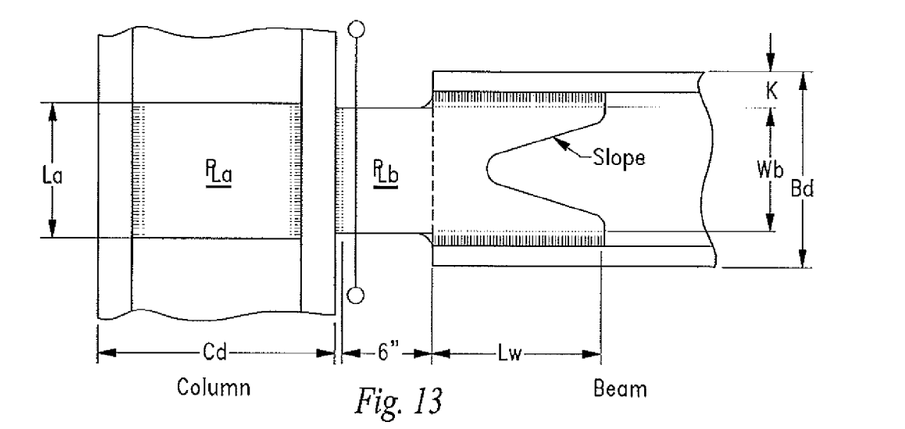
FIG. 13 is a calculation schematic for elevation views of FIGS. 6 and 12.
Figure 15:
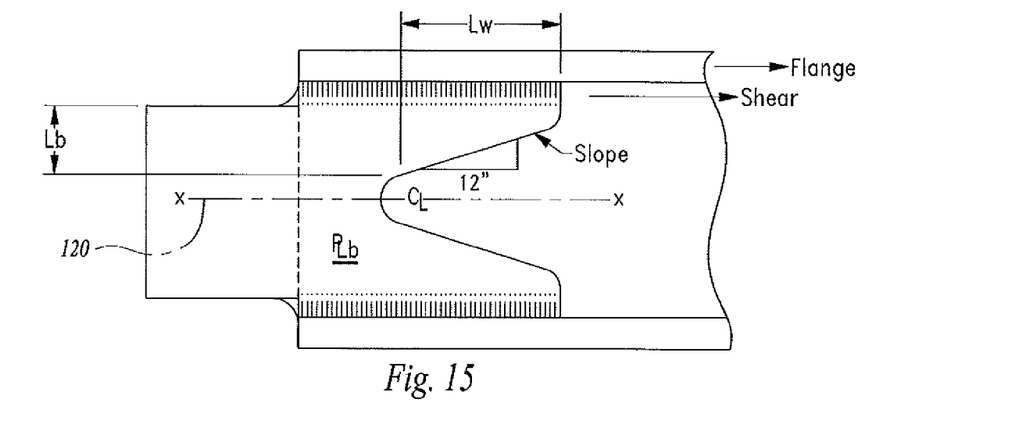
FIG. 15 is a calculation schematic for a side elevation view of the beam web of FIG. 5B with shop welded beam doubler plates for calculating the slope on the beam doubler plates from beam centerline 120 to insure even shear stress distribution on the weld through the entire length of the weld.
Figure 16:
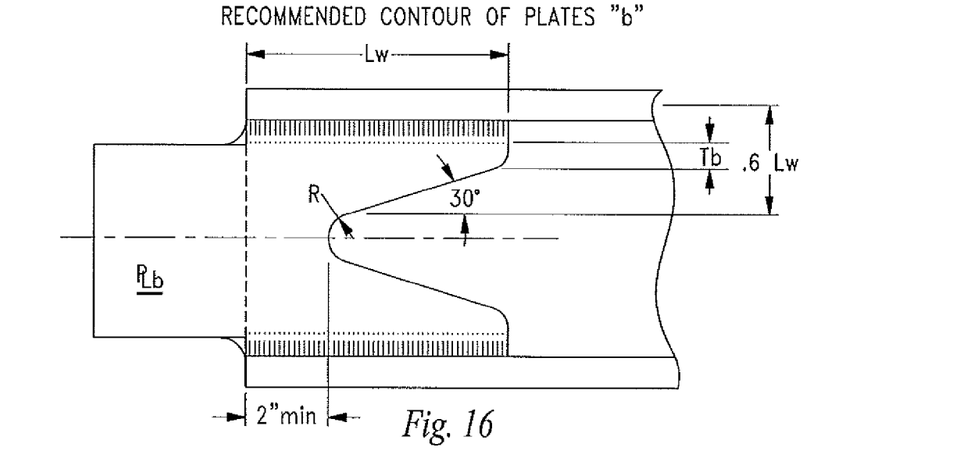
FIG. 16 is a calculation schematic for a side elevation view of the beam web with shop welded beam doubler plates of FIG. 5B for calculating the contour on the beam doubler plates.

Calculate the optimal "slope" on the beam doubler plate "b" to insure even shear stress distribution on the weld through its length "Lw" (FIGS. 13, 15 and 16)

The maximum shear force transferred from the beam flange to Plate "b" is:

$$Shear=Lw(X)Tb(X)Fv \quad\quad 16$$

$$\text{Maximum pull on plate ``}b\text{'' at 3-3}=Tb(X)Lb(X)Fb \quad\quad 17$$

Equating formulas #16 and #17:

$$Lw(X)Tb(X)0.4Fy=Tb(X)Lb(X)0.66Fy \quad\quad$$

$$\therefore Lb=0.4Lw/0.66=0.6Lw \quad\quad 18$$

$$\therefore Slope=Lb/Lw=0.6 \text{ inch per inch or, } 7.2'' \text{ per foot} \quad\quad 19$$

7. Min Plate "a" Length=La (FIG. 1)

Figure 17:
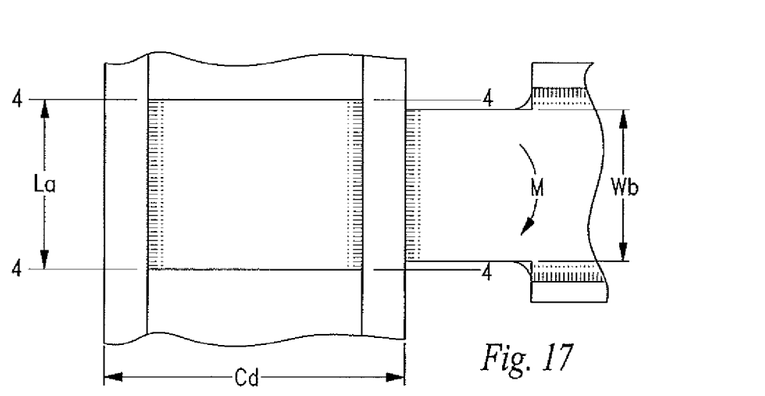
FIG. 17 is a calculation schematic for a side elevation view of the Electroslag welded moment connection of FIGS. 8 and 13 used for calculating the minimum plate length of the column web doubler plates.

The length La is to be such that the shear stress on the column web created by the moment does not exceed Fv (FIGS. 13 and 17).

$$Mb=SF(X)BSxx(X)Fb\text{—(See Form 3 at beam 20)} \quad\quad 20$$

$$Mc=Shear(X)La$$

$$\text{Maximum Shear}=Cd(X)Ctw(X)Fv$$

$$Mc=Cd(X)Ctw(X)Fv(X)La \quad\quad 21$$

Equating formulas #20 and #21

$$SF.Bsxx(X)0.66=Cd(X)Ctw\ 0.4\ Fy\ La \quad\quad 22$$

$$La=1.65(X)SF(X)BSxx/Cd(X)Ctw \quad\quad 23$$

For plate "a" length, choose the larger of La or Wb (FIG. 13)

Figure 3:
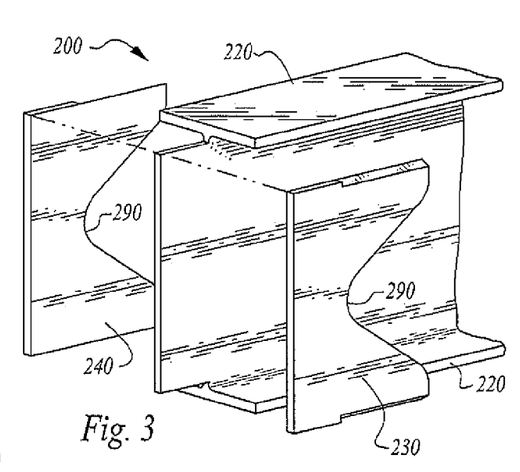
FIG. 3 is a perspective view of a section of horizontal beam 200 depicting the horizontal beam web 210, horizontal beam flanges 220, a first horizontal beam doubler plate 230 having a radius 290, and a second horizontal beam doubler plate 240 having a radius 290 prior to shop welding the doubler plates, 230 and 240, to the horizontal beam web 210 and inside of the horizontal beam flanges 220.
Figure 4:
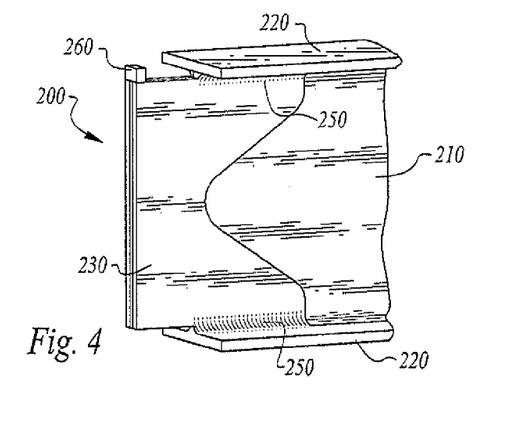
FIG. 4 is a perspective view of a section of horizontal beam 200 depicting the horizontal beam web 210, horizontal beam flanges 220, a first horizontal beam doubler plate 230 having a radius 290, and a representative shop weld 250 after shop welding the doubler plates, 230 and 240, to the horizontal beam web 210 and inside of the horizontal beam flanges 220.
Figure 5:
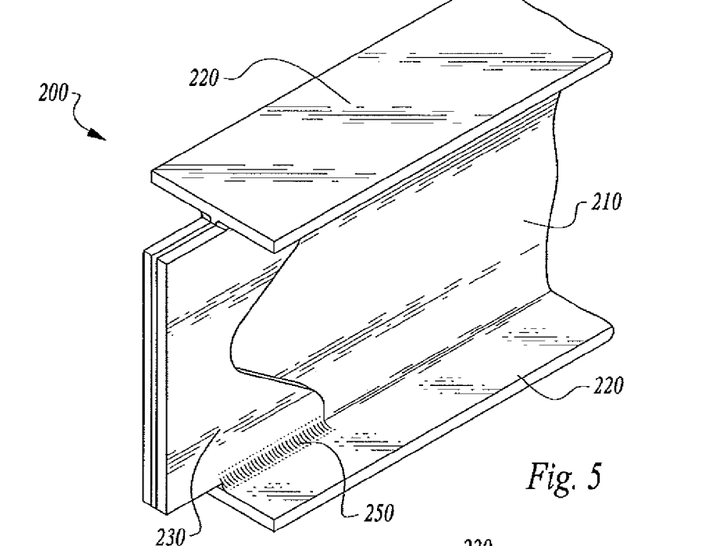
FIG. 5 is a top perspective view of the horizontal beam of FIG. 4.
Figure 5A:
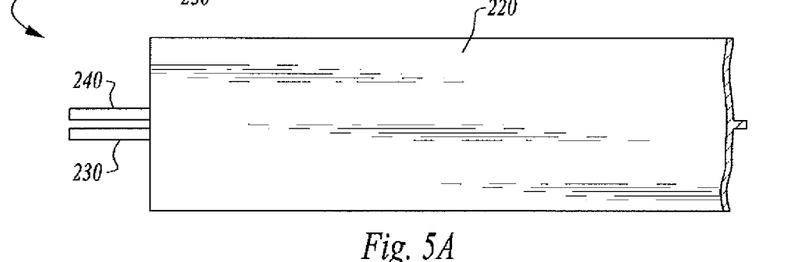
FIG. 5A is a top planar view of FIG. 5.
Figure 5B:
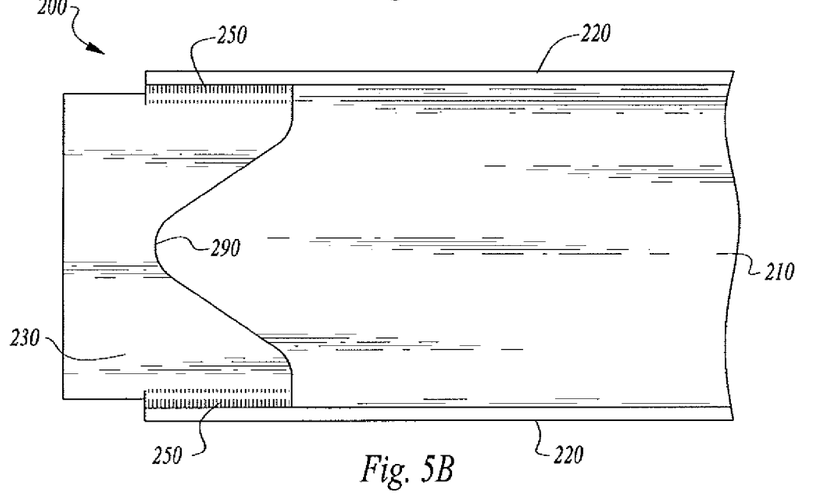
FIG. 5B is a side elevation view of FIG. 5.
Figures 6, 6A, 6B, 7:
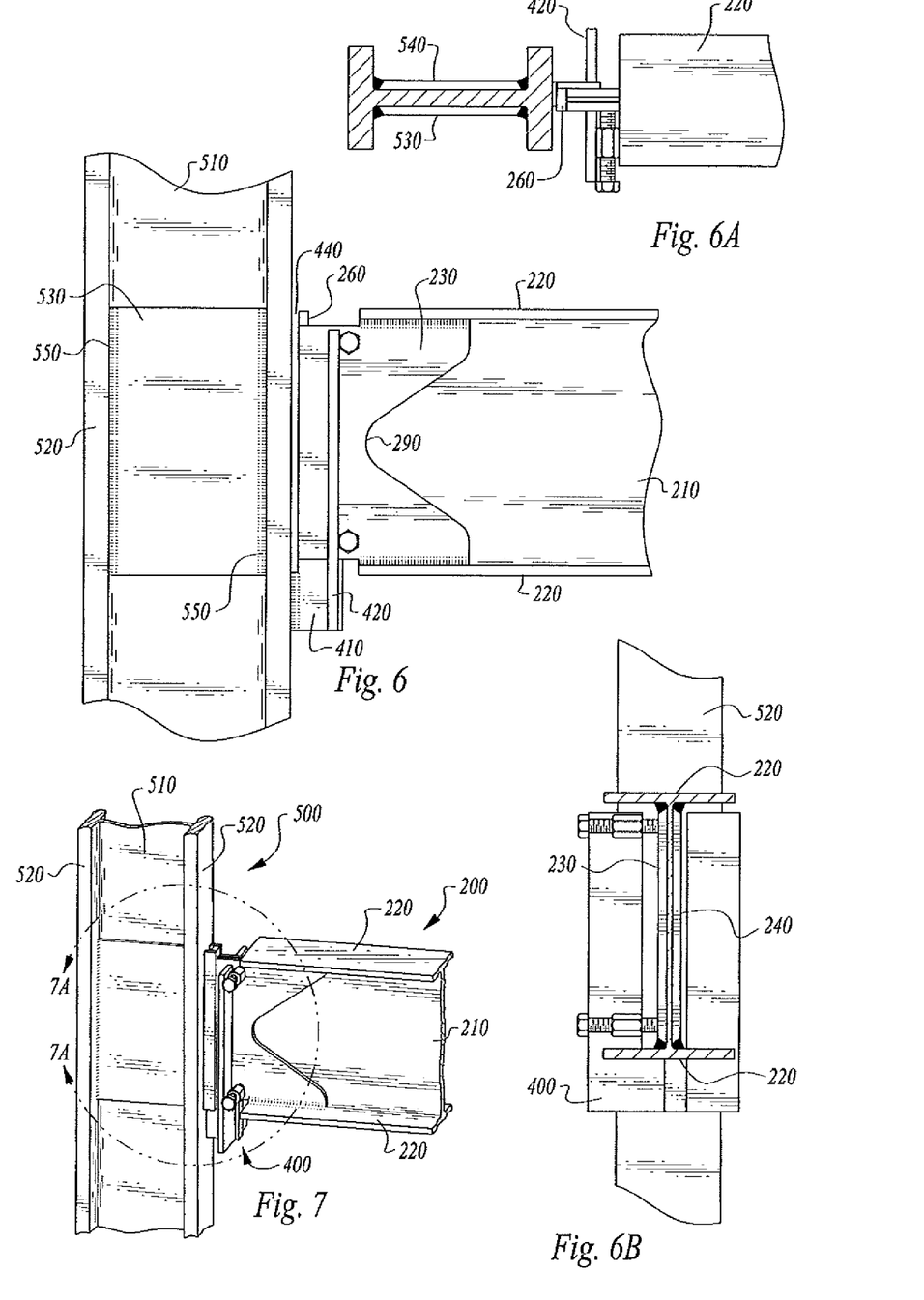
FIG. 6 is a side elevation view of vertical column of FIG. 2 attached to the horizontal beam of FIG. 4 using a horizontal beam erection support assembly 400 including a sump 410 and jack screw assembly 430 defining an Electroslag gap 440 prior to fitting the apparatus for Electroslag welding in the field.
FIG. 6A is a top planar view of FIG. 6.
FIG. 6B is a side elevation view of FIG. 6.
FIG. 7 is a top perspective view of FIG. 6 with the addition of welding shoes 310 on either side of the Electroslag gap 440 prior to fitting the apparatus for Electroslag welding in the field.
Figure 7A:
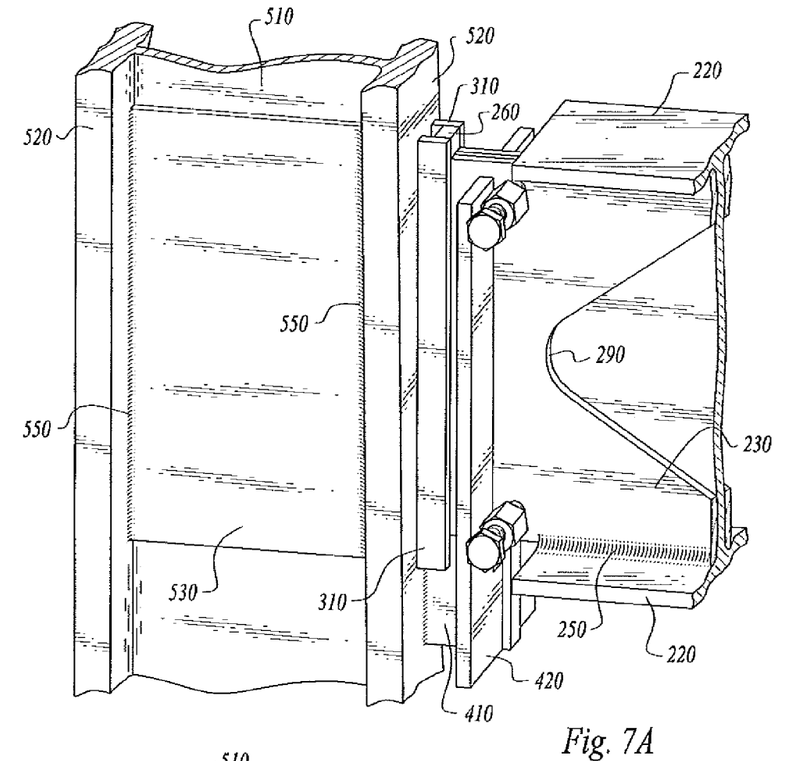
FIG. 7A is an enlarged view of FIG. 7 taken at "A.".
Figure 8:
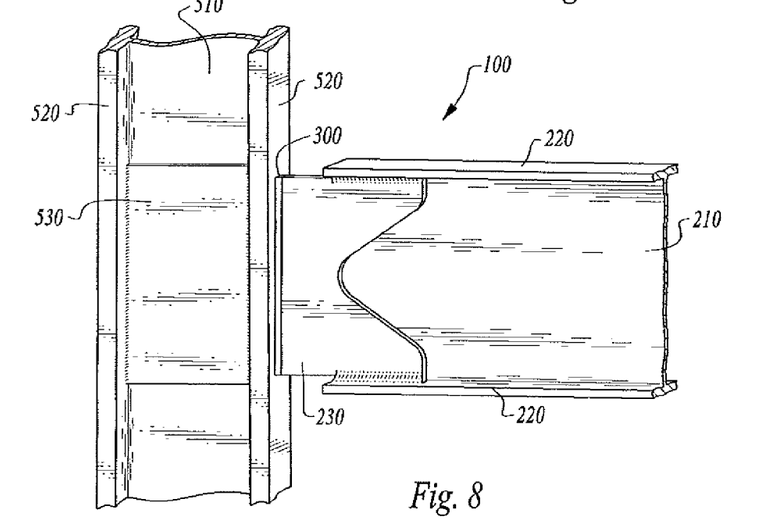
FIG. 8 is a top perspective view of the Electroslag welded moment connection 100 depicting the field Electroslag weld of the horizontal beam 200 to the vertical column 500.
Figure 9:
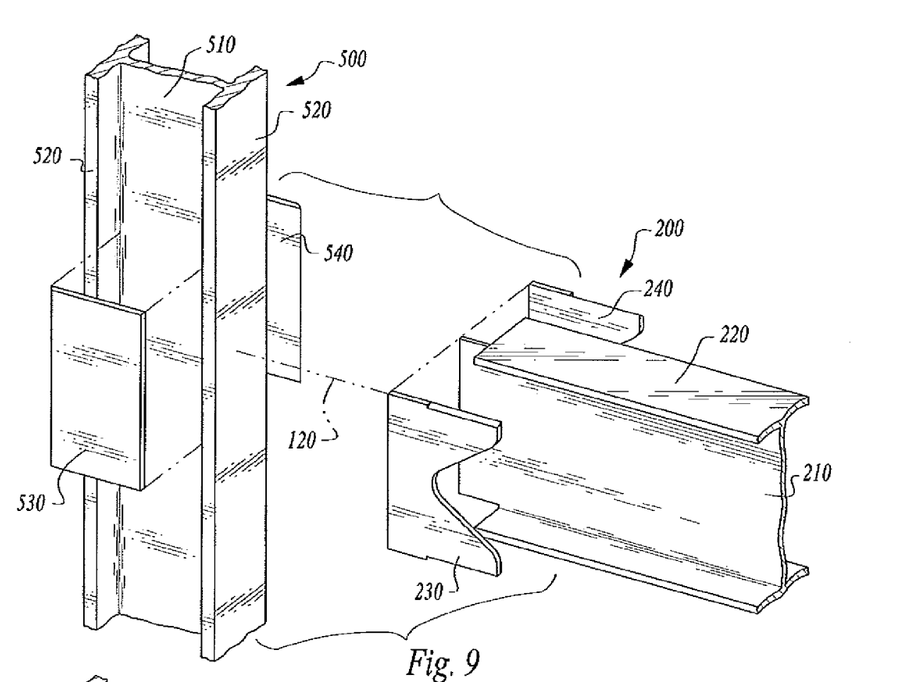
FIG. 9 is a top perspective view of the vertical column 500 and the horizontal beam 200 alignment along the moment connection horizontal centerline 120.
Figure 10:
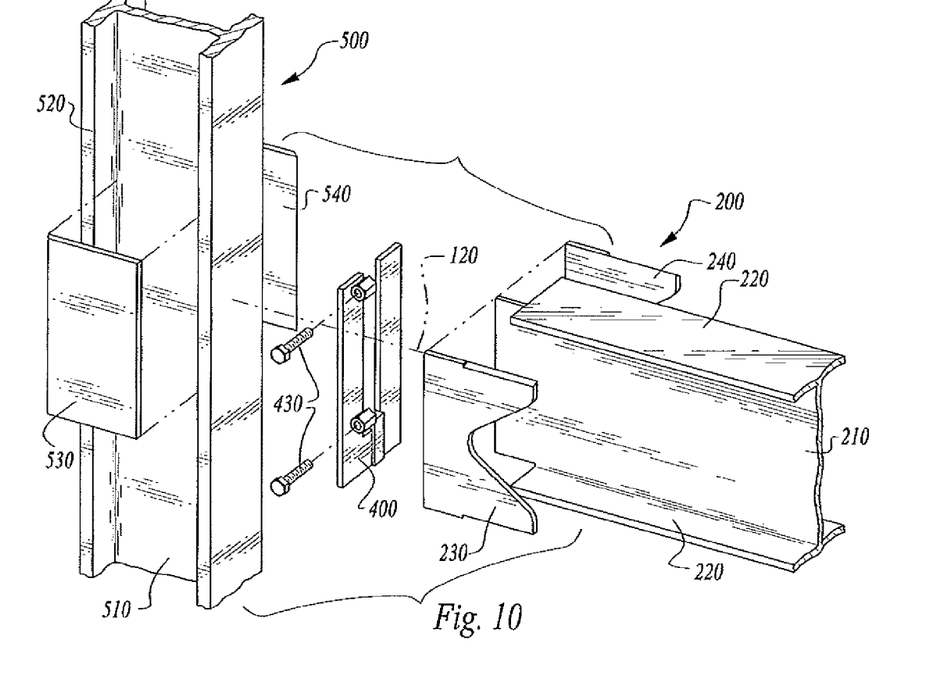
FIG. 10 is a top perspective view of the vertical column 500 and the horizontal beam 200 alignment along the moment connection horizontal centerline 120 including the horizontal beam erection support assembly 400.
Figure 11:
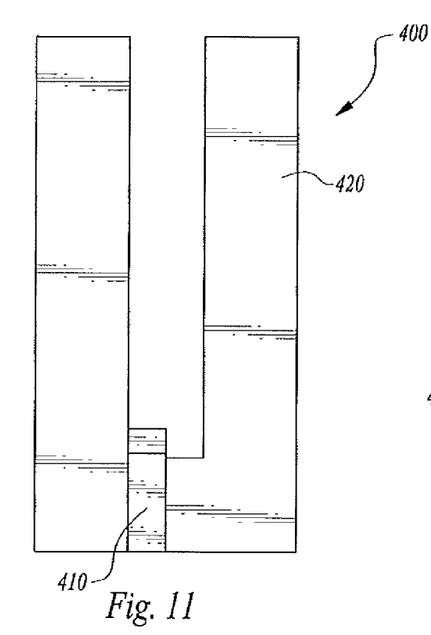
FIG. 11 is a rear elevation view of the horizontal beam erection support assembly 400.
Figure 11A:
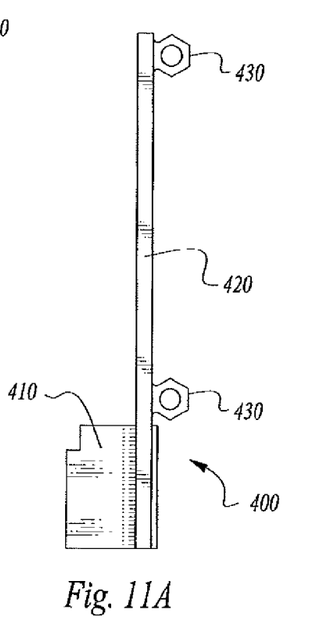
FIG. 11A is a side elevation view of FIG. 11.
Figure 11B:
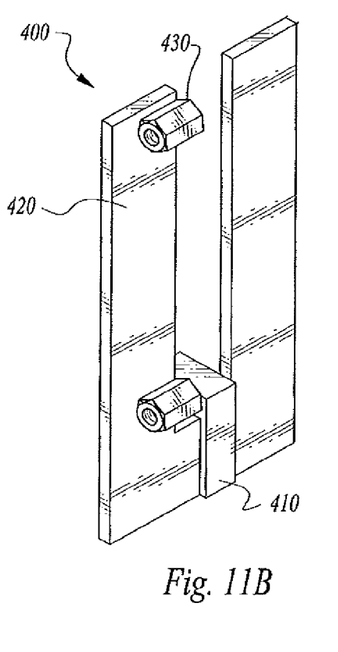
FIG. 11B is a front elevation view of FIG. 11.
Figure 11C:
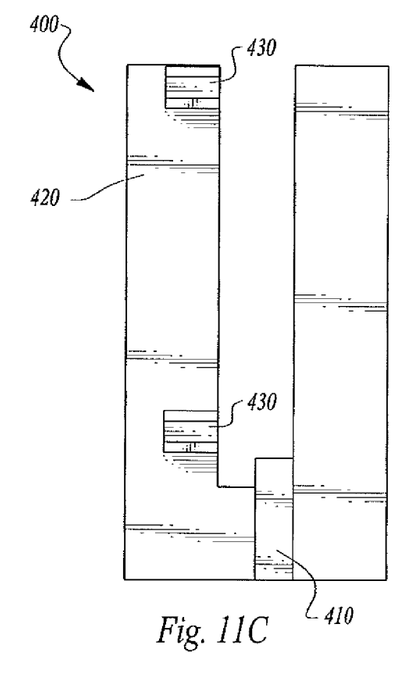
FIG. 11C is a perspective view of FIG. 11B.
Figure 12:
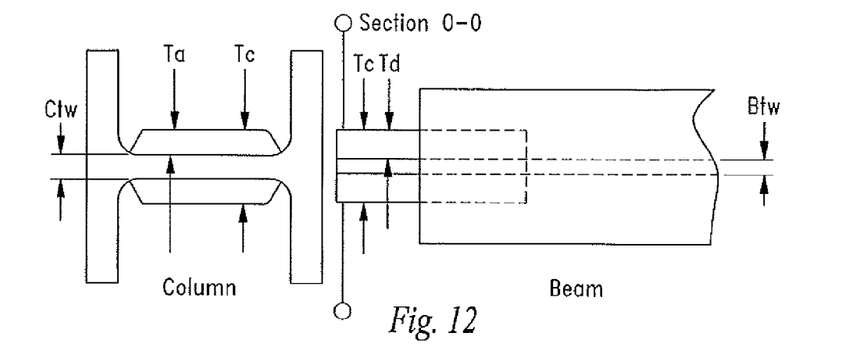
FIG. 12 is a calculation schematic for planar top views of the vertical column flanges and web and horizontal beam flanges and web and respective shop welded doubler plates for calculation of minimum weld length of FIG. 6A.

The horizontal beam flange 220 is shorter than the horizontal beam web 210, FIGS. 3 and 4. The horizontal beam web 210 and doubler plates, 230 and 240, extend beyond the horizontal beam flange 220 and are secured in position along the moment connection horizontal centerline 120 for the VertaSlag™ Electroslag field weld 300 by the horizontal beam erection support assembly 400, FIGS. 6-11C, and 15. This horizontal beam erection support assembly 400 is used to hold the horizontal beam 200 in position until the field VertaSlag™ welds join the horizontal beam web 210 and doubler plates, 230 and 240, to the vertical column flange 520.

In this fashion the horizontal beam web 210 and doubler plates, 230 and 240, are perfectly aligned with the vertical column web 510 and doubler plates, 230 and 240, that have been welded into the Arcmatic™ moment connection inside the vertical column flanges 520. This essential alignment helps carry the moment load through the vertical column 500 when a load is applied, such as wind or earthquake loading on the moment connection, FIGS. 8, 12-17.

For an embodiment of the automated assembly, system and method for vertical moment connection welding, FIGS. 3-4, 10 and 12-17, a radius 290 is cut into the horizontal beam doubler plates, 230 and 240, to reduce potential stress concentration during loading of the beam and beam-to-side plate connection. The radius 290 in the horizontal beam doubler plates, 230 and 240, allows the horizontal beam 200 to flex up-and-down during loading without promoting crack propagation during the event causing the loading.

HD-SubArc™, or other approved welding process, longitudinal shop welds are used to weld doubler plates, 530 and 540, to the vertical column web 510 and flanges 520, and to weld doubler plates, 230 and 240, to the horizontal beam web 210 and flanges 220, FIGS. 2 and 4, 12-17.

It should be noted that the distance between the columns and the beam length horizontal define the gap and, thus, set the weld cavity 440 gap for the field VertaSlag™ weld 300 that joins the to the horizontal beam web 210 and doubler plates, 230 and 240, to the vertical column flange 520. The horizontal beam erection support assembly 400 aligns the beam to column weld along the moment connection horizontal centerline 120, FIGS. 9, 10, I5 and 16. Steel plates also can be used in place of the copper shoes, and welded to the inside and outside of the VertaSlag™ weld joint to retain the molten puddle. Also, welding shoes 310, water-cooled or air-cooled, copper or steel, also are mounted on the outside of the field VertaSlag™ weld cavity 440 to retain the molten weld puddle.

The shop and field welding process and the welding procedures for the embodiments of the automated assembly, system and method for vertical moment connection welding can be pre-programmed into Arcmatic's programmable, computer controlled integrated welding system. An embodiment of the automated assembly, system and method for vertical moment connection welding includes a programmable welding fixture that clamps onto the horizontal beam. Accordingly, the welding operator for any disclosed automated assembly, system and method for vertical moment connection welding necessarily does not need to be a certified welder; the operator principally needs to be a skilled operator qualified and certified as capable of setting up the weld and running the pre-qualified welding programs. The same welding control system and methods used for Arcmatic™ VertaSlag™ welds, and/or my U.S. Letters Pat. Nos. 6,297,472 and 7,038,159, and/or my U.S. Non-provisional patent application Ser. No. 12/483,977, filed Jun. 12, 2009, are used to operate and control the assembly, method and system of electroslag beam-to-column welding including, but not limited to, automating the beam-to-column flange welds "on the job", in the field.

Further, substantially the same consumable guide tube of my U.S. Letters Pat. No. 7,148,443 is used for the automated assembly, system and method for vertical moment connection welding.

I claim:

1. A system for on-site narrow-gap Electroslag-welded beam flange moment connection between vertical column flanges for construction of buildings, wherein the full force developed by a beam flange is transferred to a block formed by a horizontal beam web and two doubler plates through a vertical column web and two doubler plates, the system comprising:

a) at least two vertical column flanges, each vertical column flange comprising at least one vertical column web block with two vertical column doubler plates shop welded on either side of the vertical column web block;

b) at least one horizontal beam comprising two ends, the at least one horizontal beam positioned between the at least two vertical column web blocks to define two welding gaps, each horizontal beam end comprising a horizontal beam web block and two horizontal beam doubler plates shop welded on either side of the horizontal beam web block, wherein each horizontal beam doubler plate comprises a flush outer end communicating with the welding gap and an equally sloped concave inner end ending in a radius;

c) at least one horizontal beam erection support assembly, comprising a sump, wedges, and a jack screw assembly for each vertical column web block, and wherein the at least one horizontal beam erection support assembly is shop welded to a side of the vertical column web block at the horizontal beam-to-column moment connection location;

d) means for Electroslag welding within the welding gap between each vertical column web block and each horizontal beam end; and e) computer controlled integrated welding system means for controlling means for Electroslag welding within the welding gap between each vertical column web block and each horizontal beam end;

wherein the slope of the horizontal beam doubler plate is optimized to provide even shear stress distribution on a high deposition, submerged arc-weld length by determining a maximum bending moment generated by the horizontal beam and determining a maximum allowable bending moment through the horizontal beam web and two horizontal beam doubler plate thicknesses, whereby the full force developed by the horizontal beam flange is transferred to the block formed by the horizontal beam web and two horizontal beam doubler plates and through the vertical column web and two vertical column doubler plates.

2. The system of claim 1, wherein a vertical column web thickness is optimized to provide even shear stress distribution on a high deposition, submerged arc-weld length by determining a maximum bending moment generated by the horizontal beam and determining a maximum allowable bending moment through the horizontal beam web and the two horizontal beam doubler plate thicknesses, whereby the full force developed by the horizontal beam flange is transferred to the block formed by the horizontal beam web and two horizontal beam doubler plates and through the vertical column web and two vertical column doubler plates.

3. The system of claim 1, wherein a vertical column doubler plate thickness is optimized to provide even shear stress distribution on a high deposition, submerged arc-weld length by determining a maximum bending moment generated by the horizontal beam and determining a maximum allowable bending moment through the horizontal beam web and the two horizontal beam doubler plate thicknesses, whereby the full force developed by the horizontal beam flange is transferred to the block formed by the horizontal beam web and two horizontal beam doubler plates and through the vertical column web and two vertical column doubler plates.

4. The system of claim 1, wherein a horizontal beam web thickness is optimized to provide even shear stress distribution on a high deposition, submerged arc-weld length by determining a maximum bending moment generated by the horizontal beam and determining a maximum allowable bending moment through the horizontal beam web and the two horizontal beam doubler plate thicknesses, whereby the full force developed by the horizontal beam flange is transferred to the block formed by the horizontal beam web and two horizontal beam doubler plates and through the vertical column web and two vertical column doubler plates.

5. The system of claim 1, wherein a horizontal beam doubler plate thickness is optimized to provide even shear stress distribution on a high deposition, submerged arc-weld length by determining a maximum bending moment generated by the horizontal beam and determining a maximum allowable bending moment through the horizontal beam web and the two horizontal beam doubler plate thicknesses, whereby the full force developed by the horizontal beam flange is transferred to the block formed by the horizontal beam web and two horizontal beam doubler plates and through the vertical column web and two vertical column doubler plates.

6. A moment connection assembly comprising:

a) at least two vertical column flanges, each vertical column flange comprising at least one vertical column web block with two vertical column doubler plates shop welded on either side of the vertical column web block;

b) at least one horizontal beam comprising two ends, the horizontal beam positioned between at least two vertical column web blocks to define a welding gap, each horizontal beam end comprising a horizontal beam web block and two horizontal beam doubler plates shop welded on either side of the horizontal beam web block, wherein each horizontal beam doubler plate comprises a flush outer end communicating with the welding gap and an equally sloped concave inner end ending in a radius;

c) at least one horizontal beam erection support assembly, comprising a sump, wedges, and a jack screw assembly for each vertical column web block, wherein each horizontal beam erection support assembly is shop welded to a side of the vertical column web block at a horizontal beam-to-column moment connection location;

d) means for Electroslag welding within the welding gap between each vertical column web block and each horizontal beam end; and e) computer controlled integrated welding system means for controlling means for Electroslag welding within the welding gap between each vertical column web block and each horizontal beam end;

wherein the slope of the horizontal beam doubler plate is optimized to provide even shear stress distribution on a high deposition, submerged arc-weld length by determining a maximum bending moment generated by the horizontal beam and determining a maximum allowable bending moment through the horizontal beam web and two horizontal beam doubler plate thicknesses, whereby the full force developed by the horizontal beam flange is transferred to the block formed by the horizontal beam web and two horizontal beam doubler plates and through the vertical column web and two vertical column doubler plates.

7. The assembly for the moment connection of claim 6, wherein a vertical column web thickness is optimized to provide even shear stress distribution on a high deposition, submerged arc-weld length by determining a maximum bending moment generated by the horizontal beam and determining a maximum allowable bending moment through the horizontal beam web and two horizontal beam doubler plate thicknesses, whereby the full force developed by the horizontal beam flange is transferred to the block formed by the horizontal beam web and two horizontal beam doubler plates and through the vertical column web and two vertical column doubler plates.

8. The assembly for the moment connection of claim 6, wherein a vertical column doubler plate thickness is optimized to provide even shear stress distribution on a high deposition, submerged arc-weld length by determining a maximum bending moment generated by the horizontal beam and determining a maximum allowable bending moment through the horizontal beam web and two horizontal beam doubler plate thicknesses, whereby the full force developed by the horizontal beam flange is transferred to the block formed by the horizontal beam web and two horizontal beam doubler plates and through the vertical column web and two vertical column doubler plates.

9. The assembly for the moment connection of claim 6, wherein a horizontal beam web thickness is optimized to provide even shear stress distribution on a high deposition, submerged arc-weld length by determining a maximum bending moment generated by the horizontal beam and determining a maximum allowable bending moment through the horizontal beam web and two horizontal beam doubler plate thicknesses, whereby the full force developed by the horizontal beam flange is transferred to the block formed by the horizontal beam web and two horizontal beam doubler plates and through the vertical column web and two vertical column doubler plates.

10. The assembly for the moment connection of claim 6, wherein a horizontal beam doubler plate thickness is optimized to provide even shear stress distribution on a high deposition, submerged arc-weld length by determining a maximum bending moment generated by the horizontal beam and determining a maximum allowable bending moment through the horizontal beam web and two horizontal beam doubler plate thicknesses, whereby the full force developed by the horizontal beam flange is transferred to the block formed by the horizontal beam web and two horizontal beam doubler plates and through the vertical column web and two vertical column doubler plates.

* * * * *